Figures 1, 2:
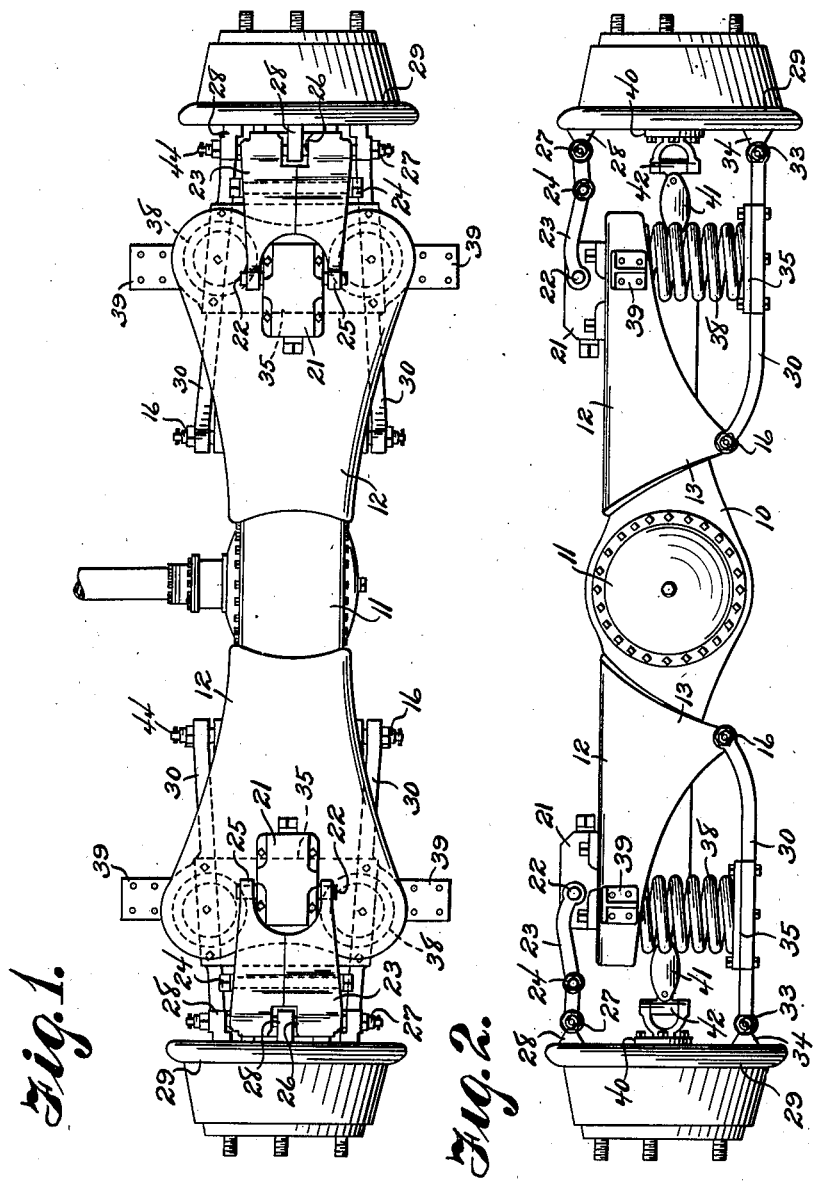

March 31, 1942.  P. BLASER  2,278,303
WHEEL SUSPENSION FOR MOTOR VEHICLES
Filed April 5, 1941  2 Sheets-Sheet 1

Paul Blaser
INVENTOR
BY Victor J. Evans & Co.
ATTORNEYS

March 31, 1942.   P. BLASER   2,278,303
WHEEL SUSPENSION FOR MOTOR VEHICLES
Filed April 5, 1941   2 Sheets-Sheet 2
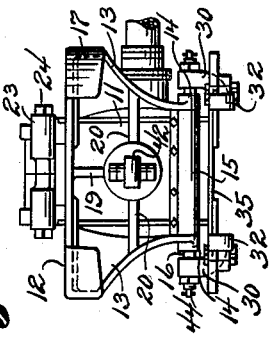
Paul Blaser
INVENTOR
BY Victor J. Evans & Co.
ATTORNEYS Patented Mar. 31, 1942

2,278,303

UNITED STATES PATENT OFFICE 2,278,303

WHEEL SUSPENSION FOR MOTOR VEHICLES

Paul Blaser, Rosevear, Alberta, Canada, assignor of five per cent to Theodore L. W. Matter, Leduc, Alberta, Canada Application April 5, 1941, Serial No. 387,086

2 Claims. (Cl. 280—124)

The present invention relates to improvements in wheel suspensions for motor vehicles especially adaptable for the rear or driving axle connections.

An object of the invention is to provide a wheel suspension for motor vehicles designed to afford increased riding comfort with maximum safety.

Another object of the invention is the provision of a wheel suspension which will afford independent vertical movement of the drive wheels relative to the axles of the vehicle.

A further object of the invention is to provide a wheel suspension which will improve the riding qualities of a vehicle by enabling vertical movement of the drive wheels without imparting excessive motion to the vehicle body.

Still another object of the invention is the provision of a drive wheel suspension which is relatively simple and durable in construction and efficient in use.

Other objects and advantages of the invention will become apparent as the description progresses.

In the accompanying drawings forming a part of this specification and in which like numerals are employed to designate corresponding parts throughout:

Figure 1 is a top plan view of the improved suspension in assembly with the rear axle housing and wheel connections of a vehicle, Figure 2 is a rear elevational view of the same, Figure 3 is a fragmentary vertical section through the same, Figure 4 is a fragmentary bottom plan view thereof, Figure 5 is an end view of the suspension mechanism, Figure 6 is an end view of the wheel mounting, Figure 7 is a top plan view of one of the suspension connectors showing its parts in separated relation, and Figure 8 is a top plan view of a bottom suspension connector.

Referring in detail to the drawings, wherein for the purpose of illustration is shown a preferred example of the invention, 10 generally designates the transversely arranged rear or drive axle housing of a vehicle in which are mounted the live axle shafts driven through the medium of a conventional differential gearing mounted in a centrally disposed casing 11.

On each laterally extending section of the axle housing is rigidly mounted a longitudinally extending support member 12, in the present example embodying a saddle-shaped sheet metal structure having a flat top of tapering formation. The inner reduced end portion of this saddle member embraces the housing and is formed with vertically depending skirt portions 13 at the front and rear sides terminating in annular bearings 14 and having a sleeve 15 extended therebetween. Through the bearings 14 and the sleeve 15 is extended a pivot shaft 16 for a purpose which will be hereinafter described. The outer portion of each saddle member 12 provides a relatively wide shoulder portion formed with flanges 17 at the sides and ends and shaped to provide, at the under side, a pair of transversely spaced annular bosses 18. Within the top and side portions of the saddle-shaped support are formed longitudinally extending perforated ribs 19 and 20, perpendicular to the top plate and the skirts thereof and firmly fastened to the housing by welding or the like.

On the outer top part of each support 12 is mounted a conventional shock absorber 21 which may advantageously be of pneumatic or hydraulic type having laterally projecting pivot pins 22 on the movable part. To these pivot connections of each absorber is connected the inner end of a connector arm 23 composed of a pair of complementary longitudinally divided sections normally secured in edge to edge assembly by a bolt and nut fastening 24 extended through transverse bores in the sections. When operatively assembled the inner end of each arm 23 is shaped to form a yoke having transversely spaced eyes 25 which rigidly engage the absorber pins 22. At the outer end the arm is shaped to provide an intermediate slot 26 at each side of which are provided transverse bearing bores making connection with a pivot stud 27. This stud is supported in three transversely spaced bearing eyes 28 mounted at the inner upper portion of a shoe-carrying anchor disk 29 of a conventional wheel mounting which may include a rotary brake drum equipped with studs for connection with the drive wheel of the vehicle.

The under side of each suspension assembly embodies a connector having a pair of complementary bars 30 formed at one end with bearing eyes 31 mounted on the end portions of the pivot element 16. The outer ends of these bars are shaped to converge and are provided with bearing eyes 32 rockably engaging the outer projecting end portions of a pivot shaft 33 supported in a pair of transversely spaced bearings 34 attached to the bottom portion of the disk 29. Mounted transversely on intermediate portions of the bars 30 is an elongated web or plate 35 cupped to form spring seats 36 on the end portions and provided with longitudinal corrugations 37 intermediate the spring seats to strengthen the same. This plate element is fastened on the complementary bars by bolts 38 to prevent displacement thereof. As shown to advantage at Figure 3, the bars 30 are curved upwardly at their inner ends while the major portions thereof normally assume approximately horizontal positions.

Mounted vertically between the support member 12 and the lower connector assembly is a pair of coiled compression springs 38 disposed in parallel vertical positions and maintained against displacement by engagement with the seat formations 18 and 36. To the outer side portions of the member 12 are connected brackets 39 bolted to the flanges of the support and apertured for connection with the vehicle body.

The usual drive axle in each side of the housing 10 is drivably connected with the spindle 40 of each vehicle drive wheel by an extension shaft section 41, the inner end of which is connected, through the medium of a gimbal type universal joint 42, with the drive axle while the opposite end is connected, through a similar universal joint, with the wheel spindle. This universally jointed shaft extension is designed to permit independent vertical movement of each drive wheel with relation to the vehicle chassis and body. In order to enable axial or endwise extension of the drive shaft connection a slip joint may be provided in any suitable manner therein, as is known in this art. This may be effected by providing a non-circular stud 43 on the inner universal joint slidably engaging a correspondingly shaped socket in the axle shaft of the differential drive.

In order to properly lubricate the pivot connections of the apparatus suitable means, such as the nipples 44, are mounted in connection with the bearings for conducting lubricant to the bearing surfaces.

As will be readily apparent the suspension apparatus described in the foregoing provides a compact and durable assembly for independent mounting of the drive wheels of the vehicle with relation to the drive shafts thereof and provides efficient means whereby sudden shock imparted to the wheels in riding over inequalities is absorbed by the springs 38 thereof in conjunction with the shock absorber devices 21 without imparting substantial or excessive shock or motion to the chassis of the vehicle. Furthermore, such construction will preclude loss of driving power and will reduce tire wear.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In a wheel suspension for motor vehicles, a support member adapted to be fitted on the side section of an axle housing comprising a flat plate tapered longitudinally of the housing section to form a relatively wide shoulder portion at its outer end, the under side of the said shoulder portion being formed to provide a pair of transversely spaced bosses constituting spring receiving seats, a skirt depending from the edge of the said shoulder portion, and a pair of vertically depending relatively wide side skirt sections formed at the edges of the inner reduced portion of the plate and merging into the skirt portion about the shoulder.

2. In a wheel suspension for motor vehicles, a support member adapted for fitting on each side of an axle housing comprising an elongated plate mounted horizontally on the housing, the said plate being tapered longitudinally of the housing to form a relatively wide shoulder portion at the outer end, an annular spring receiving boss formed on the under face of the plate at each side portion of the shoulder, a pair of vertical side sections formed at the opposed side edges of the inner transversely reduced portion of the plate, and a relatively narrow skirt depending from the outer and side edges of the shoulder portion and merging into the said vertical side sections.

PAUL BLASER.